June 13, 1961  A. R. BUCHHOLZ ET AL  2,988,092
ELECTRICALLY CONTROLLED COIN DISPENSING MACHINE
Filed March 17, 1958  10 Sheets-Sheet 1

INVENTORS
Arnold R. Buchholz
Frank Habart
BY Quarles & French
Atty.

INVENTORS
Arnold R. Buchholz
Frank Habal
BY
Marles & French
Attys

INVENTORS
Arnold R. Buchholz
Frank Haband
BY
Quarles & French
Att'ys

June 13, 1961 A. R. BUCHHOLZ ET AL 2,988,092
ELECTRICALLY CONTROLLED COIN DISPENSING MACHINE
Filed March 17, 1958 10 Sheets-Sheet 8

INVENTORS
Arnold R. Buchholz
Frank Haban
BY Quarles & French
Attys.

June 13, 1961
A. R. BUCHHOLZ ET AL
2,988,092
ELECTRICALLY CONTROLLED COIN DISPENSING MACHINE
Filed March 17, 1958
10 Sheets-Sheet 9
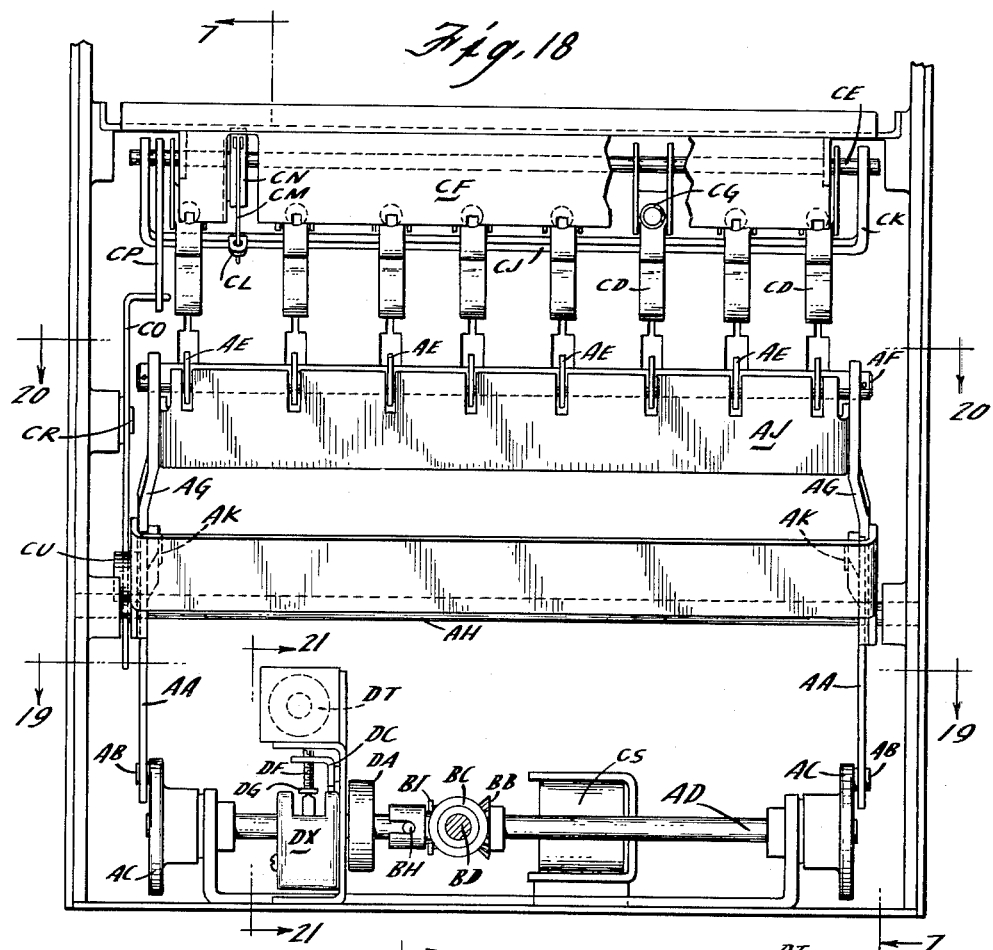
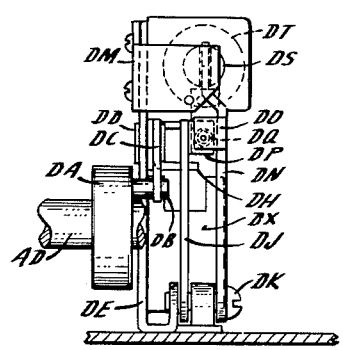
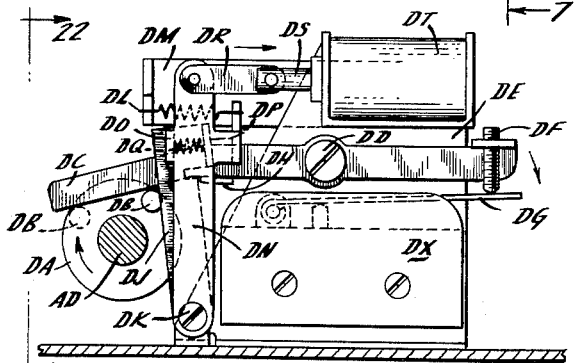
INVENTORS
Arnold R. Buchholz
Frank Haban
BY
Marles & French
Attys.

United States Patent Office 2,988,092
Patented June 13, 1961

2,988,092
ELECTRICALLY CONTROLLED COIN DISPENSING MACHINE
Arnold R. Buchholz and Frank Haban, Watertown, Wis., assignors to Brandt Automatic Cashier Company, Watertown, Wis., a corporation of Wisconsin
Filed Mar. 17, 1958, Ser. No. 721,743
9 Claims. (Cl. 133—4)

The invention relates to coin dispensing machines and more particularly to electrically controlled coin dispensing machines.

The object of the invention is to provide a new and improved key controlled keyboard apparatus that may be located at a distance from the dispensing apparatus to control its operation and is applicable to either a coin payer or coin changer and especially to a novel keyboard apparatus that insures only a single payment regardless of the way or fashion the operator operates the keys.

A further object of the invention is to provide a keyboard apparatus in which the depression of one or more keys actuates one or more rockers that actuate a switch which controls a relay that in turn controls a locking bar that locks the actuated rockers against movement and also operates a switch controlling the power source of the dispensing mechanism and also opens the key operated switch so that the machine has to go through its dispensing cycle regardless of whether the operator holds down the depressed key or carelessly presses down on some other key.

This application is a continuation in part of our application Serial No. 591,988, filed June 18, 1956, now abandoned, and includes an improved coin dispensing unit, and the incorporation in the key controlled circuit of an additional switch which controls the rack bar operating solenoid so that this solenoid operates the rack bar and releases the latch for the rocker operated bar before the motor switch is closed so as to insure complete payment and prevent the possibility of recycling of the machine if any depleted magazine is not reloaded until after it is completely empty.

The invention further consists in the several features hereinafter set forth and more particularly defined by claims at the conclusion hereof.

In the drawings:

FIG. 7a is a view similar to FIG. 7 showing certain of the parts in a different position;

FIG. 14 is a circuit diagram of certain modifications where the keyboard is used as a changer;

FIG. 16 is a vertical sectional view taken on the line 16—16 of FIG. 15;

FIG. 18 is a vertical sectional view through the dispensing apparatus, taken on the line 18—18 of FIG. 7, parts being broken away;

FIG. 21 is a detailed vertical sectional view taken on the line 21—21 of Fig. 18;

FIG. 22 is an end elevation looking along the line 22—22 of Fig. 21;

The function of the keyboard features hereinafter described are equally applicable to either a payer or changer, but since the keys of a payer dispense the exact amount while the keys of a changer represent the difference between the purchase price and the amount received, the keys are differently numbered from that of the payer. Both keyboards are designed to work on a dollar basis, but since in the case of a changer, it is desirable to handle tenders of less than a dollar, additional operations are necessary when operating on this basis that will be explained in connection with FIGS. 14 and 16.

The keyboards herein are designed to control the selective positioning of motor operated coin ejector mechanisms so that the selected ejectors may then act to dispense the desired coins. Parts of the dispensing unit are shown in FIGS. 7, 7a, 12, 13, and 18 to 23.

Referring to FIGS. 7, 7a, 8, and 18, the dispensing unit includes a housing 1 having a coin receiving tray T mounted thereon and provided with coin receiving channels A, B, C, D, E, F, G, and H. One cent coins are dispensed, one at a time, from channel A. Two one cent coins, at a time, are dispensed from channels B and C, respectively. One nickel, at a time, is dispensed from channel D. One dime, at a time, is dispensed from each channel E and F. One quarter, at a time, is dispensed from channel G, and one half dollar, at a time, is dispensed from channel H.

A coin ejector mechanism is associated with each of the above channels, that for the channel H being selected as representative of any one of the channels. Each ejector mechanism includes a coin ejector finger AE working through a slot in the coin tray and pivotally mounted on a transversely disposed shaft AF carried at its ends in the upper arms of oppositely disposed bell crank levers AG that are pivotally mounted intermediate their ends on a transversely disposed pivot shaft AH, said finger being normally urged downwardly by its own weight and guided in a slot of a spacer bar AJ on said lever. The lower arm of each lever AG is pivotally connected by a pin AK to one end of a link AA. The other end of each link AA is pivotally connected to a crank pin AB on a crank disc AC mounted on a motor driven shaft AD.

Figure 19:
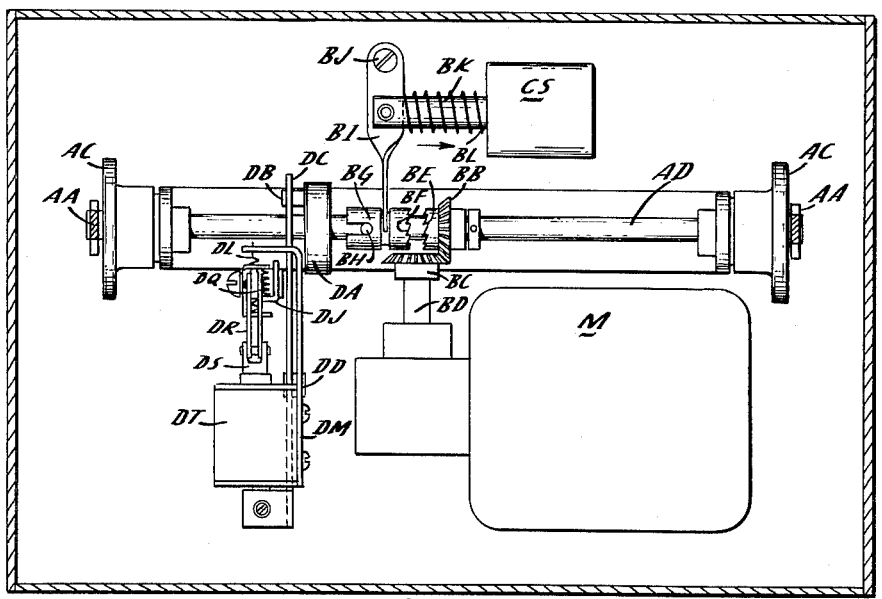
FIG. 19 is a detailed horizontal sectional view taken on the line 19—19 of FIG. 18.
Figure 20:
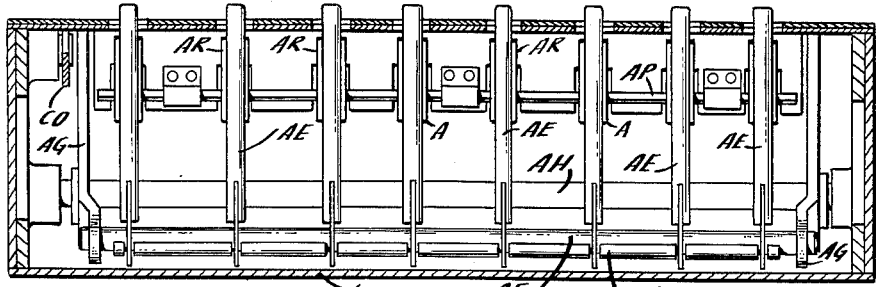
FIG. 20 is a detailed horizontal sectional view taken on the line 20—20 of FIG. 18.
Figure 23:
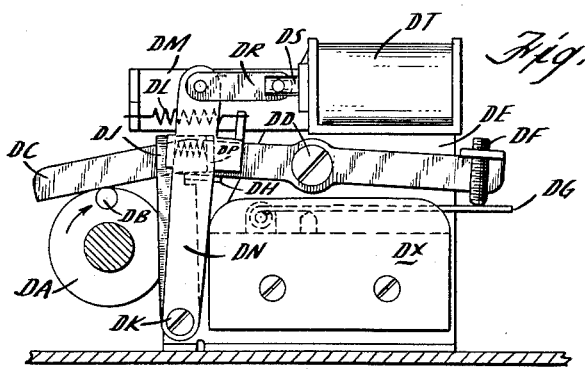
FIG. 23 is a view similar to FIG. 21 showing the parts in a different position.

Referring to FIGS. 18 and 19, the shaft AD carries a bevel gear BB meshing with a bevel gear BC on the output shaft BD of a reduction geared electric motor M, the hub of gear BB having a clutch face BE adapted to mesh with a mating clutch face BF on a grooved collar BG slidably keyed to the shaft AD by a pin and slot connection BH and engaged by the forked end of a lever BI pivoted at BJ on the machine frame and pivotally connected intermediate its ends with the plunger BK of a solenoid CS, said collar and plunger being normally urged to a clutch release position by a spring BL acting on lever BI. On energization of solenoid CS, the clutch faces BF and BB are engaged and the motor through the gears BB and BC rotates the shaft AD which through the cranks and links above described reciprocates the links AA and thereby oscillates the levers AG which in turn reciprocates the fingers AE.

Figure 7:
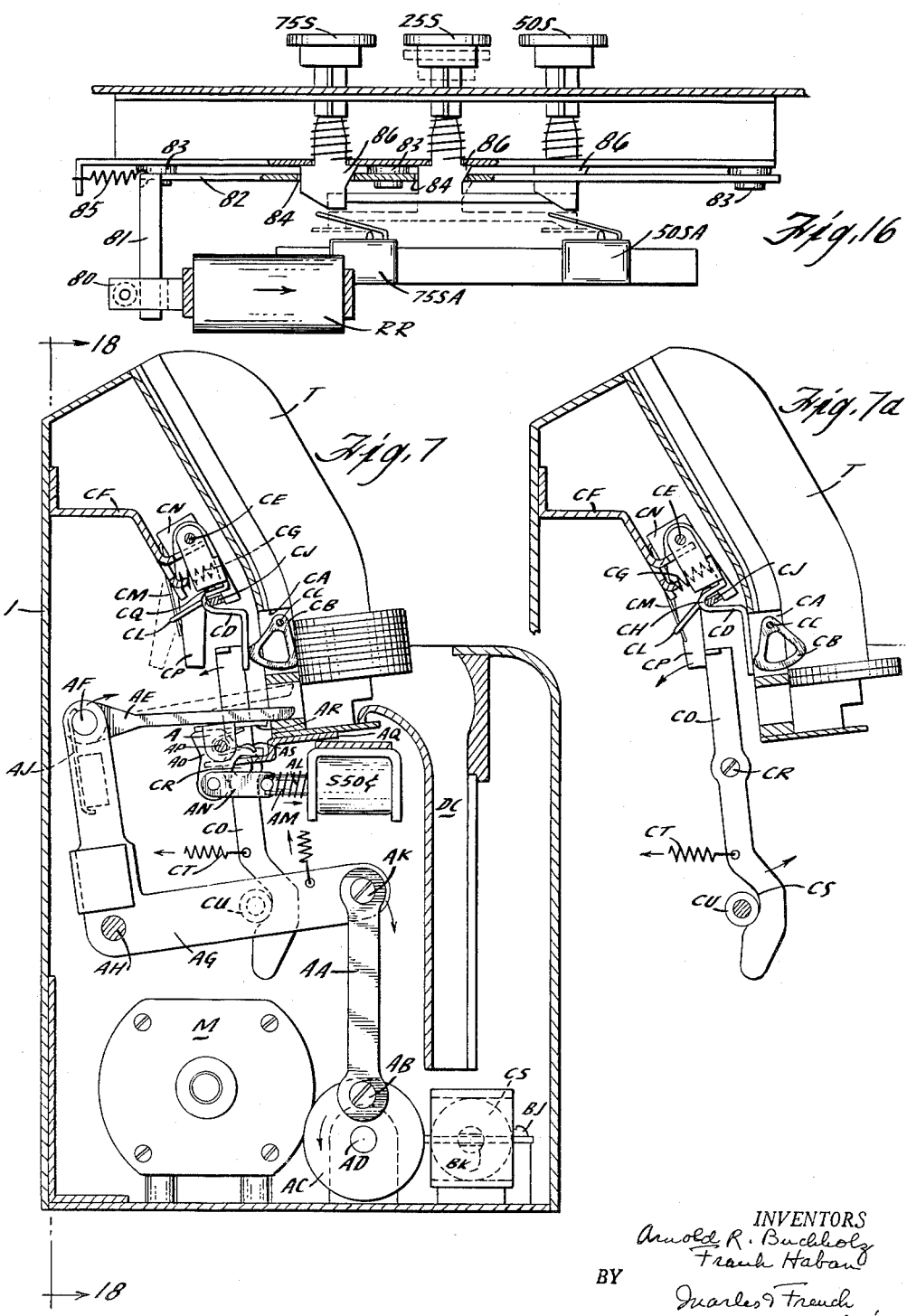
FIG. 7 is a vertical sectional view through a dispensing unit of a type that may be controlled by a keyboard embodying the invention, taken on the broken line 7—7 of FIG. 18.
Figure 8:
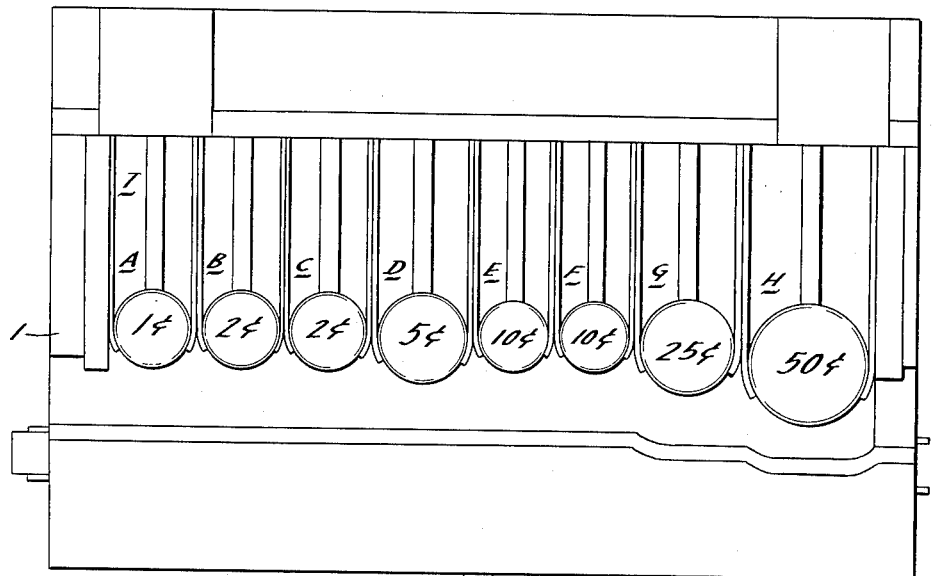
FIG. 8 is a plan view of the dispensing unit shown in FIG. 7.

To render any one of the fingers AE effective to dispense coins from its associated coin channel, each finger is raised to a coin dispensing position by a solenoid operated means which in FIG. 7 has been shown in detail in connection with the solenoid S50¢ whose plunger AL, normally moved to a return position by a spring AM, is operatively connected by a link AN with one arm of a lever AO suitably pivotally mounted on a pin AP on a shelf bracket AQ. A second lever AR, engaging the ejector finger AE, is also pivotally mounted on the pin AP and a spring AS is interposed between these levers AO and AR so that the lever AR is swung upwardly by pressure exerted through spring AS when the lever AO is swung counterclockwise on the energization of solenoid S50¢, and this acts to swing the ejector finger AE from its full line to its dotted line position, as shown in FIG. 7, so that on its forward stroke or movement toward the right it ejects a half dollar from the coin channel H.

Means are provided to prevent the operation of the machine in the event of a coin depletion in any one of the coin channels and then permit only one or more specially controlled operations before the depleted channel is refilled.

Referring to FIGS. 7, 7a, and 18, each coin channel has a slot CA and a coin engaging lever on finger CB is pivotally mounted at its upper end CC to work in said slot. Each finger CB is yieldingly held against the stack of coins in its associated channel by a lever CD pivotally mounted at its upper end on a transversely extending shaft CE carried by a shelf CF and urged against the finger by a spring CG. Each of the levers CD has a notch CH formed therein and the transverse portion CJ of a U-shaped bar CK is seated in said notch, the legs of said bar being pivotally mounted on the shaft CE. The bar CJ carries an apertured bracket arm CL in which the outer end of an actuator CM for a normally open switch CN is mounted. When a coin depletion in any one of the stacks occurs, the finger CB of that stack is free to move outwardly into its associated coin channel and it lever CD under the action of its spring CG is swung toward the right as viewed in FIG. 7 to in turn swing the bar CJ counterclockwise so that its arm CL presses on the actuator CM to close the switch CN and as hereinafter described the closing of this switch acts to open the motor circuit to stop further action of the machine. Further operations of the machine are permitted as hereinafter described by the operation of a depletion release key DR (in the keyboard) prior to the depressing of a dispensing key. The key DR acts on the intermediate portion of a lever EA (see FIGS. 3 to 5) pivoted on the machine at EB and adapted to engage the actuator EC of a depletion release switch DRS. To permit the coins in the channels to feed down freely on each dispensing operation of the machine, pressures of the levers CD on the fingers is momentarily relieved by the engagement of a lever CO with a lever arm CP on the shaft CE which is notched at CQ to engage the bar portion CJ. The lever CO is operated in proper cyclic sequence with the levers AG, and for this purpose is pivotally mounted intermediate its ends on a pivot CR and has a cam notch CS held by a spring CT against a roller CU carried by one of the levers AG so that as this lever AG swings down, the upper bent end of lever CO engages the lever CP to swing it clockwise and with it the bar portion CJ and the levers CD engaged thereby to swing them away from their fingers CB to relieve the pressure on said fingers.

Referring to FIGS. 19 and 21 to 23, the shaft AD has the crank disc DA mounted thereon carrying a cam or crank pin DB which near the end of the turning movement of said shaft is adapted to engage one end of a lever DC pivotally mounted intermediate its ends on a pin DD carried by a bracket DE to swing the other screw carrying end DF of said lever into engagement with the actuator DG of a switch DX to shift it to its other position to stop the motor as hereinafter described. The lever DC has a latching projection DH adapted to be engaged by a notched latching lever DJ mounted on a pivot pin DK. A second lever DN is also pivotally mounted on pin DK and normally urged to a release position by a spring DL connected to an extension of said lever and anchored to a fixed bracket DM and has a laterally disposed projection DO facing a similar projection DP on the lever DJ. The projections DO and DP are operatively connected together by a coiled spring DQ which is weaker than the spring DL so that the lever DJ is moved to unlatched position and also acts to swing lever DN counterclockwise and thereby through a link DR operatively connected to a plunger DS of a solenoid DI move said plunger to its release position. Energization of the coil of solenoid DI acts to swing lever DN toward the right as viewed in FIG. 21 putting pressure on the spring DQ to move the latch lever DJ to the latched position shown in FIG. 23 just before the lever DC is moved by the pin DB to shift the switch DX to its other position.

Figure 1:
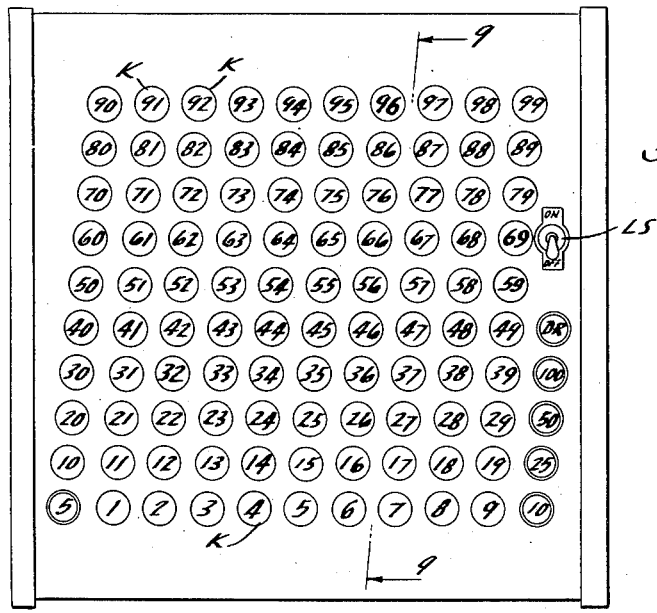
FIG. 1 is a plan view of a payer keyboard embodying the invention.
Figure 2:
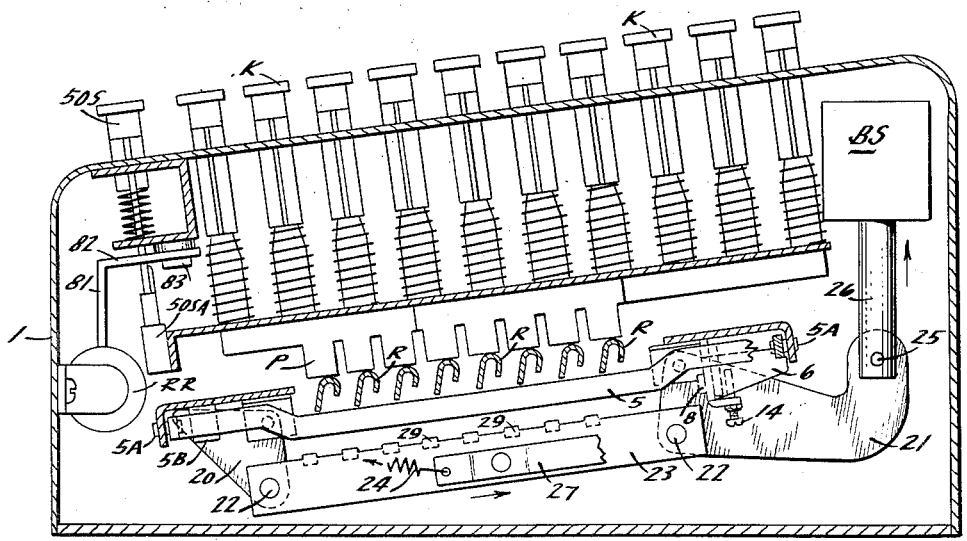
FIG. 2 is a vertical sectional view taken through the key section of the keyboard along the line 2—2 of FIG. 3 with a changer switch indicated.
Figure 15:
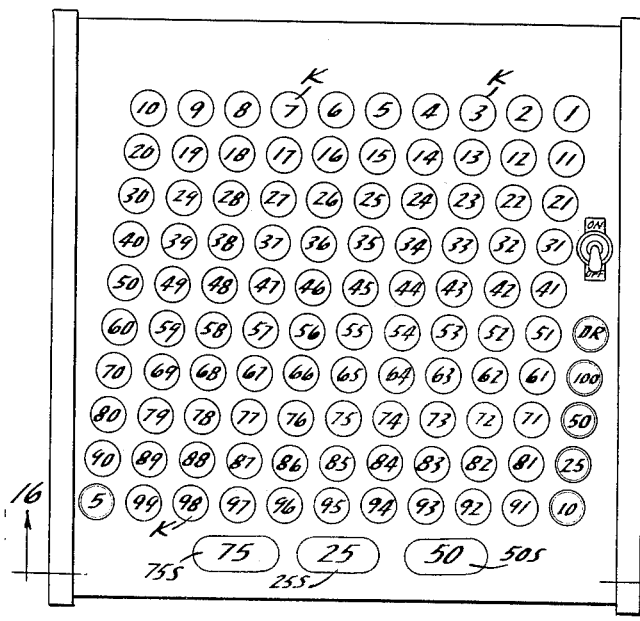
FIG. 15 shows the changer form of full keyboard.
Figure 9:
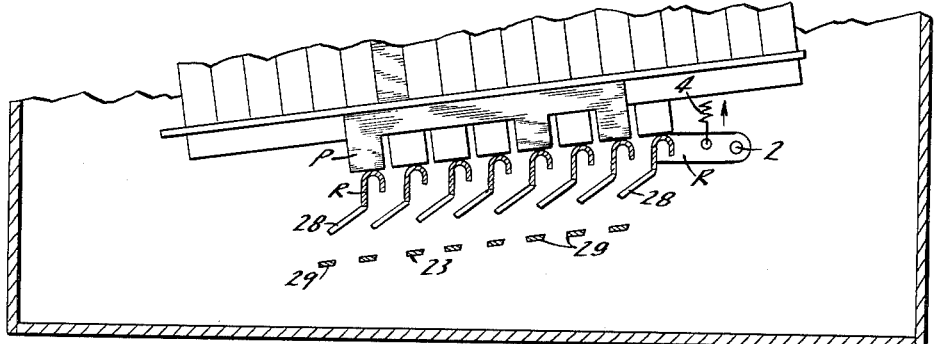
FIG. 9 is a vertical sectional view taken on the line 9—9 of Fig. 1.

Referring to FIGS. 1 and 15, the keys K of each keyboard are of known construction and are spring operated to a release position, and their details may be found in the following prior U.S. patents: Brandt No. 1,850,198, dated Mar. 22, 1932, and Brandt No. 1,822,560, dated Sept. 8, 1921. The keys are designed to provide one or more projections P, each of which is disposed over a rocker R (see FIG. 2).

Referring to FIGS. 3 to 6 and 9, each rocker is pivotally mounted at its ends on the pins 2 mounted in the side frame members 3 of the machine and held against the keys by a spring 4. When any one of the keys K is depressed, one or more of the rockers R will be operated depending upon the form of the projections, these projections being designed to actuate those rockers which act to dispense the least amount of coins to make up the payment.

Figure 3:
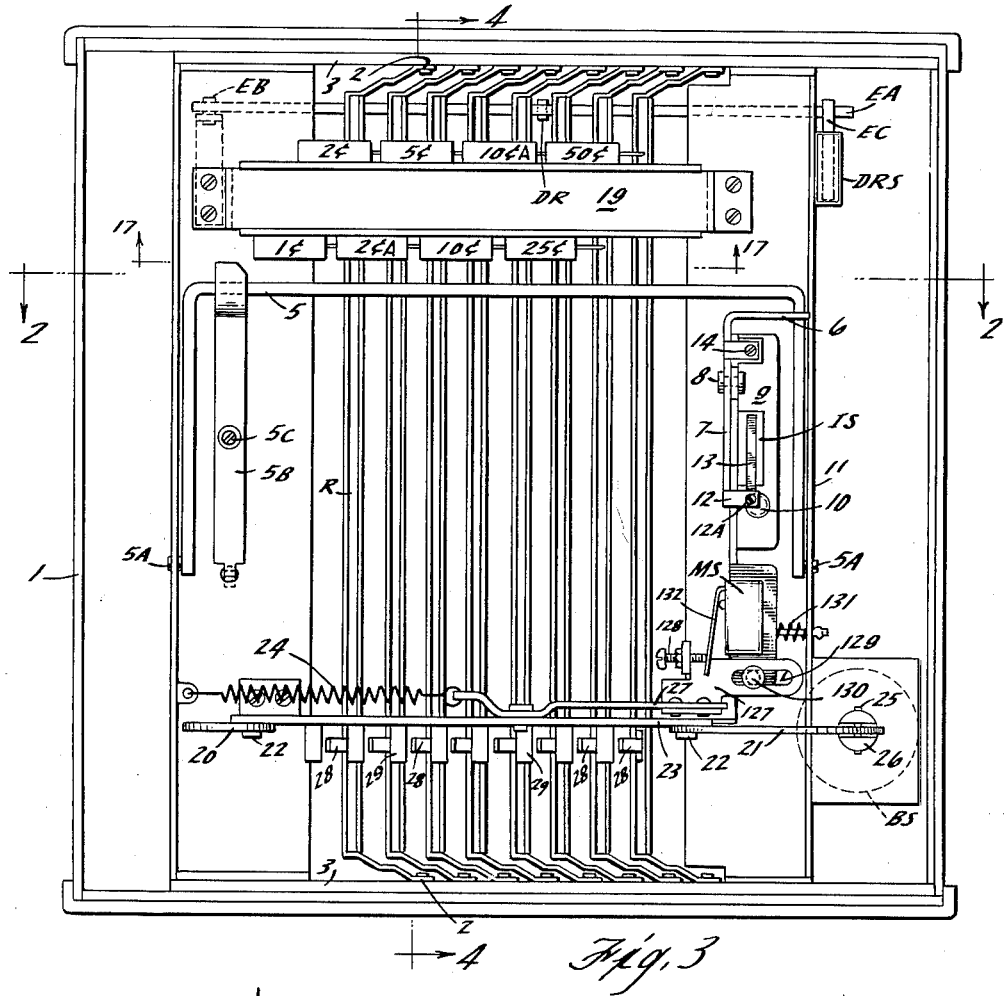
FIG. 3 is a plan view looking up from the bottom of the apparatus.
Figure 4:
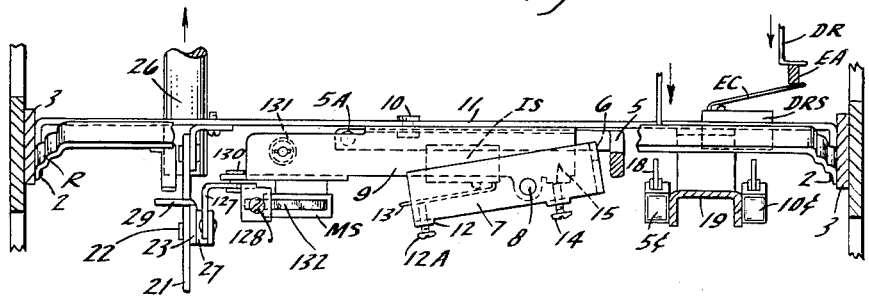
FIG. 4 is a vertical secitonal view taken on the line 4—4 of FIG. 3.
Figure 5:
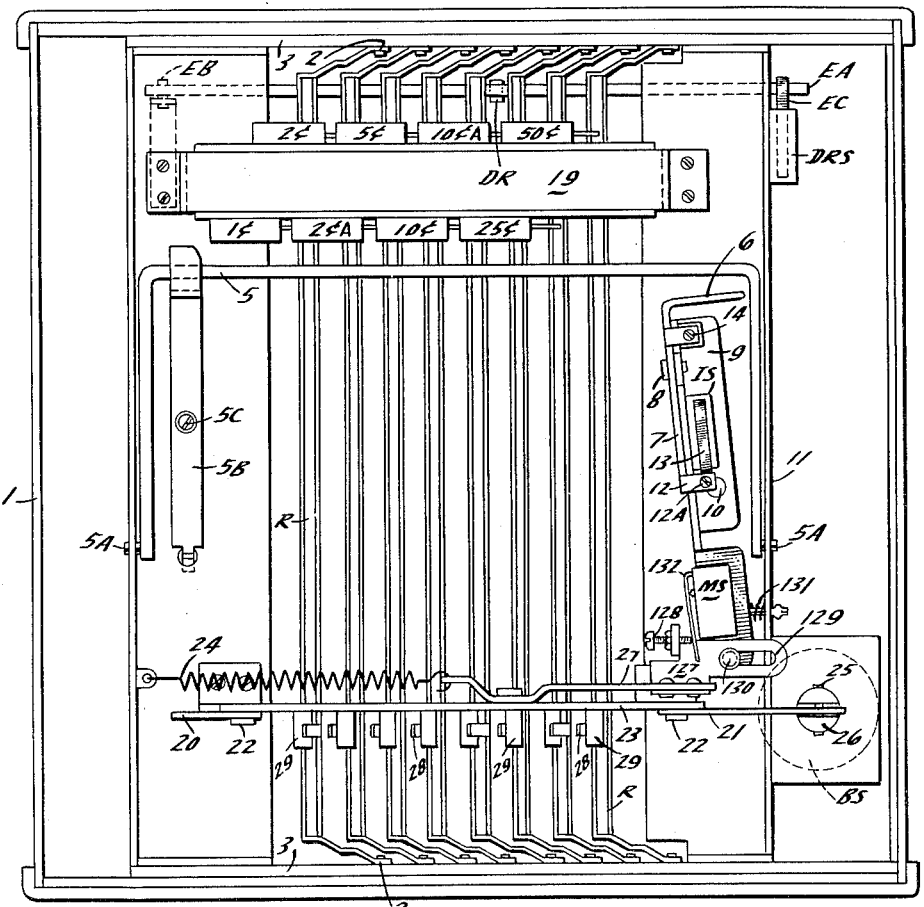
FIG. 5 is a view similar to FIG. 3 showing the parts in a different position.
Figure 6:
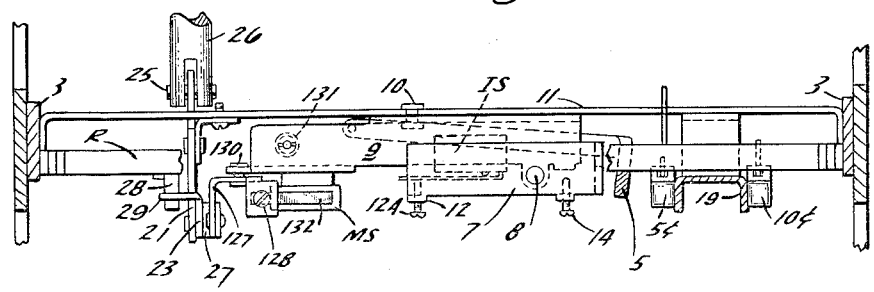
FIG. 6 is a view similar to FIG. 4 showing the parts in a different position.

Referring to FIGS. 2 to 6, mounted in the path of movement of the rockers R is the transverse portion of a U-bar 5, here termed an equalizing bar, whose legs are pivotally mounted on the frame of the machine at 5A so that when any key is depressed to operate one or more rockers R, these rockers will in turn swing the bar 5 downwardly and in doing so engage a foot 6 on a switch actuating lever 7 pivotally mounted at 8 on another lever 9 which is pivotally mounted at 10 on a frame member 11 so that it swings in a plane at right angles to the plane of swinging movement of the lever 7. The bar 5 is yieldingly urged upwardly to a limited extent by a pivoted lever 5B (indicated in FIG. 3) and a spring 5C acting on said lever. The lever 7 has a lateral projection 12 carrying a screw 12A for engagement with the actuator 13 of a normally open pilot switch IS, said actuator being biased to its switch open position in which its contact with screw 12A is determined by adjusting screw 14 mounted on the lever 7 and engageable with a stop 15 on the lever 9. Engagement by the bar 5 with the foot 6 of lever 7, as shown in FIGS. 3 and 4, swing this end of the lever 7 down and the projection 12 up to move the actuator 13 to close the switch IS as shown in FIG. 6.

Figure 17:
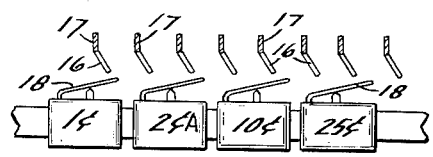
FIG. 17 is a detailed vertical sectional view taken on the line 17—17 of FIG. 3.
Figure 10:
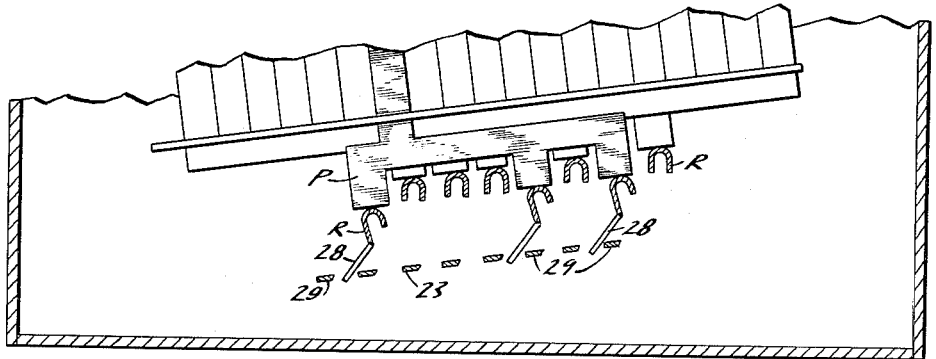
FIGS. 10 and 11 are views similar to FIG. 9 showing parts in different positions.
Figure 11:
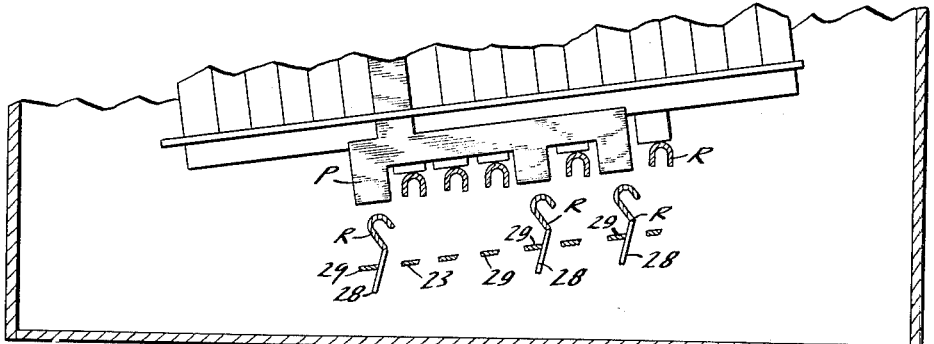

Whenever a rocker R is depressed by a key, its projection 16 (see FIG. 17) at its indented end portion 17 is adapted to engage a switch actuator 18 of a control switch. The control switches are designated 1¢, 2¢, 2¢A, 5¢, 10¢, 10¢A, 25¢, and 50¢ and respectively control the solenoids S1¢, S2¢, S2¢A, S5¢, S10¢, S10¢A, S25¢, and S50¢, shown in FIG. 12. Some of these control switches and their actuators are shown in FIG. 17, and they are also indicated in FIGS. 3 and 5 as being mounted on a bracket 19 suspending them below the rockers R. Referring to FIGS. 2 to 6, levers 20 and 21 are pivotally mounted in spaced relation on the machine frame. One arm of each of said levers is pivotally connected at 22 to an end of a rack bar 23 which is normally biased by a spring 24 to the leftward position shown in FIG. 3 by its connection with a bracket arm 27. The lever 21 is an actuating lever and its other arm is pivotally connected at 25 to the outer end of a plunger 26 of a bar operating solenoid BS. The bracket arm 27 secured to move with the bar 23 and is fastened to the angled end of a switch and lever actuator member 127 which adjustably carries a switch actuator screw 128 and has a slot 129 in which a pin 130 on one end of lever 9 works and by which it is engaged at the desired time. The lever 9 is independently biased by a spring 131 to urge the lever 9 and consequently the lever 7 so that the foot 6 of this last named lever will be normally disposed in the path of movement of the bar 5 as shown in FIG. 3. The lever 9 adjacent its pin end carries a normally open circuit control switch MS whose actuator 132 is adapted to be engaged by the screw 128. In the leftward position of the rack bar 23 projections 28 on the rockers R are free to pass down between the spaces of the teeth 29 of said bar when said rockers are swung down by the keys as indicated in Fig. 10. When, however, the bar 23 is moved toward the right as shown in FIGS. 5 and 11, the key operated rockers R are engaged by the teeth 29 and held against movement until the bar is returned by the spring 24. Also in the position shown in FIG. 11, the careless depression of another key cannot swing any of the other rockers down as these are blocked by the teeth of the rack to a position blocking operation of any of the other control switches. In FIGS. 10 and 11, the rockers R for the control switches 1¢, 10¢, and 25¢ have been actuated.

When the bar 5 is swung down as previously described to close the switch IS, this switch closes circuit hereinafter described to energize solenoid BS whose plunger then moves the rack bar 23 as previously described and in doing so the screw 128 engages actuator member 127 to close motor switch MS, the parts previously described being in the position shown in FIG. 6 and thereafter as the solenoid completes its stroke, the pin 130 is engaged by member 127 to swing the lever 9 and with it the lever 7 to the poistion shown in FIG. 5, thus freeing the lever 7 from the bar 5 to open the switch IS while the motor switch MS remains closed, and since the lever 7 is free of the bar 5, any further movement of this bar can have no effect on the levers 7 and 9.

Figure 12:
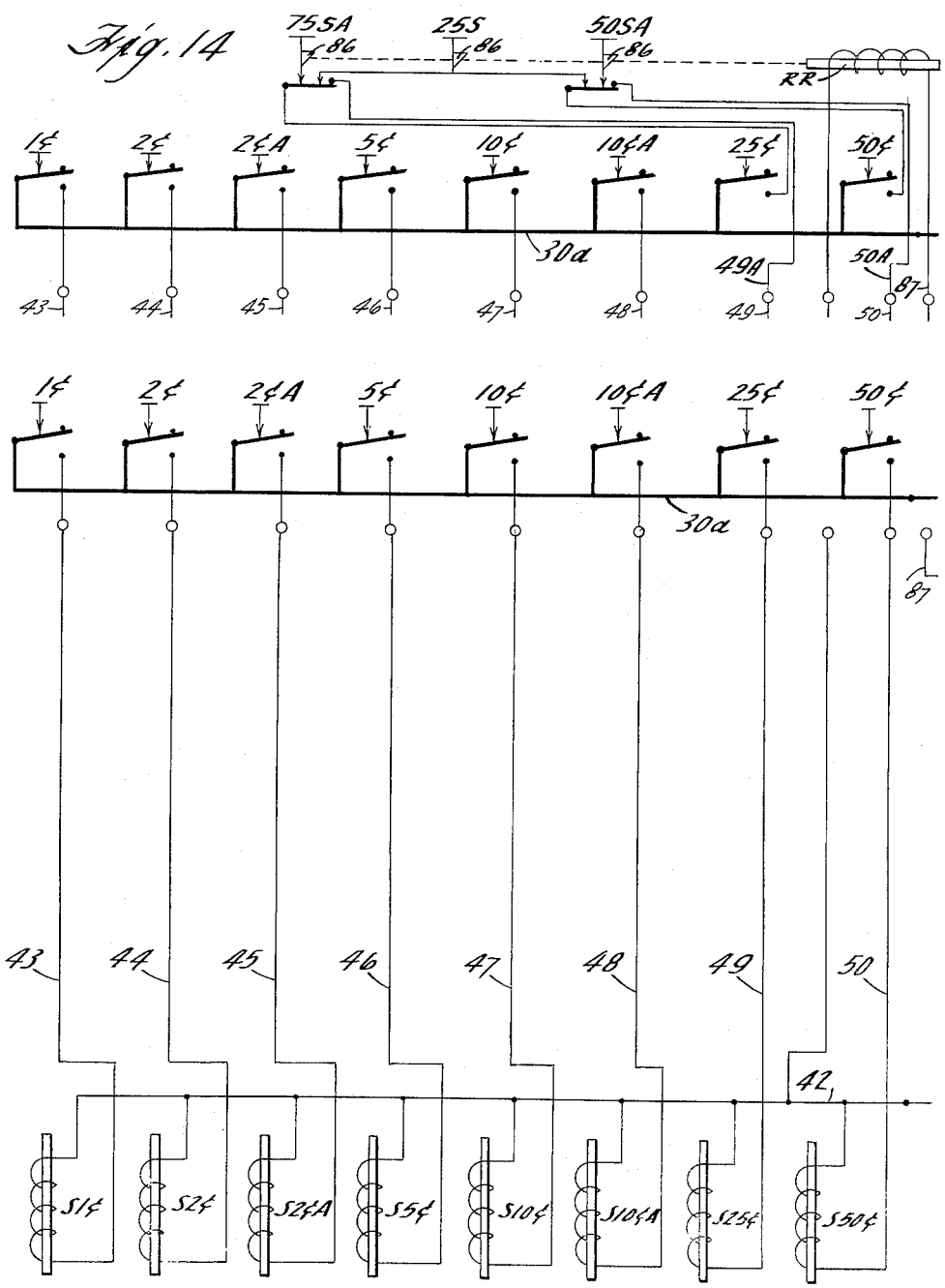
FIG. 12 is the left hand side of a circuit diagram for the payer keyboard.
Figure 13:
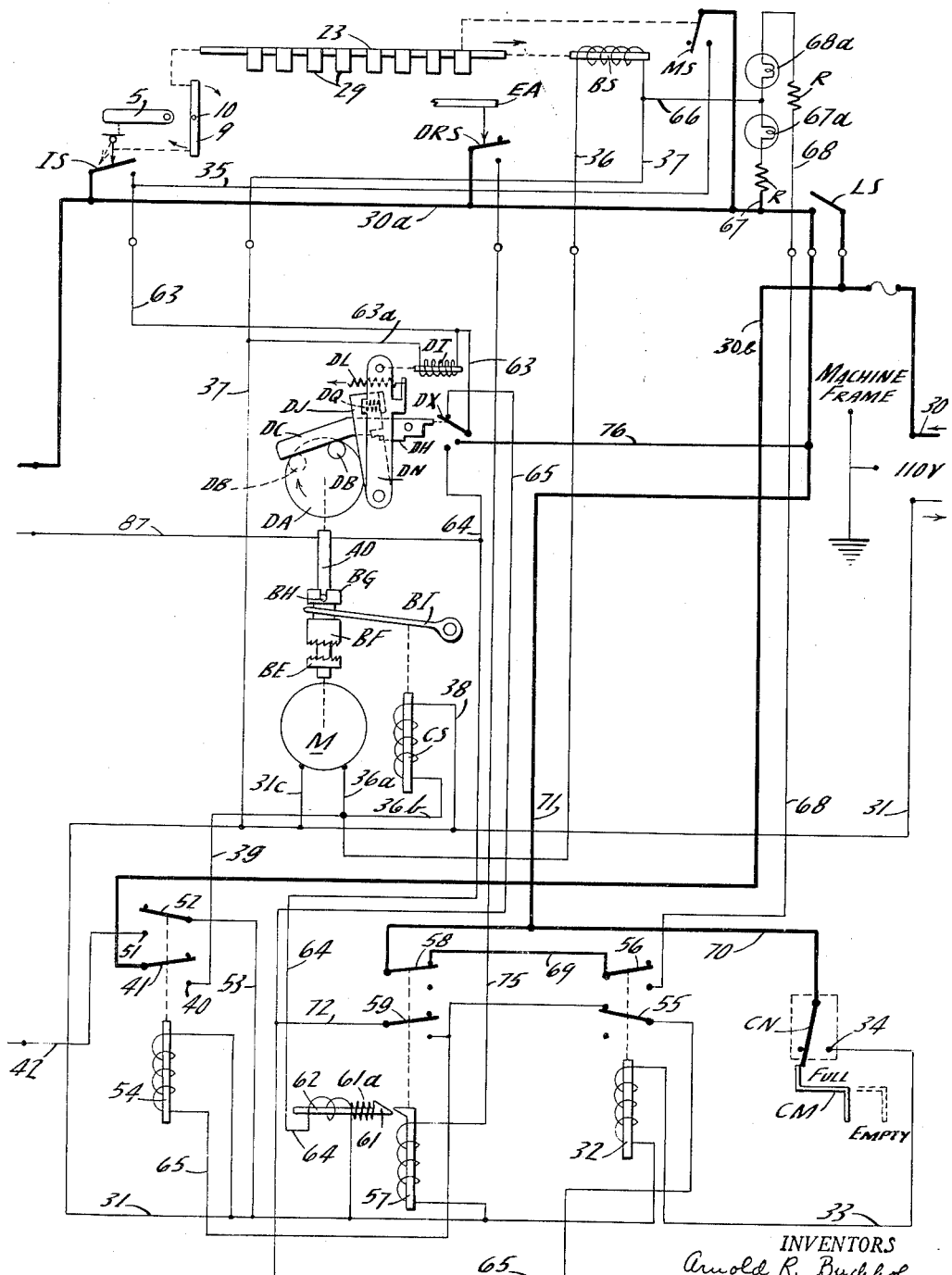
FIG. 13 is the right hand side of the circuit diagram shown in FIG. 12 associated with parts in the dispensing unit.

Referring to FIGS. 12 and 13, a current supply line 30 has branch conductors 30a and 30b, conductor 30a including a manually operated line switch LS. One side of each of the switches 1¢, 2¢, 2¢A, 5¢, 10¢, 10¢A, 25¢, and 50¢ is connected with conductor 30a. A current return line 31 connects with one terminal of the coil of a relay 32 whose other terminal is connected by a conductor 33 with a switch terminal 34 for the switch CN. A conductor 35 includes switches IS and MS and is connected across the conductor 30a. A conductor 36 includes the coil of solenoid BS, the other side of this coil being connected by a conductor 37 with the return 31. Branch conductors 36a and 36b from conductors 36 lead respectively to one terminal of the motor M and to one terminal of the coil of the solenoid CS whose other terminal is connected by conductor 38 to the return 31. The other terminal of the motor is connected by a conductor 31c with the return line 31. A branch conductor 39 also leads from conductor 36 to a fixed contact 40 for a switch 41 whose other terminal is connected to conductor 30b. The other terminals of switches 1¢, 2¢, 2¢A, 5¢, 10¢, 10¢A, 25¢, and 50¢ are respectively connected to a common conductor 42 by conductors 43, 44, 45, 46, 47, 48, 49, and 50, said conductors respectively including the coils of relays or solenoids S1¢, S2¢, S2¢A, S5¢, S10¢, S10¢A, S25¢, and S50¢. Conductor 42 connects with a fixed contact 51 of a switch 52 whose other terminal is connected by a conductor 53 with the return 31. The switches 41 and 52 are relay operated switches controlled by the coil of a relay 54.

Relay 32 controls switches 55 and 56 and a latching type relay 57 controls switches 58 and 59. The latch 61 for relay 57 forms part of the plunger of a solenoid 62 and is spring pressed to locked position by a spring 61a and released by the coil of this solenoid.

A conductor 63 connects a switch DX with conductor 35 and a conductor 63a between this conductor and the conductor 37 includes the coil of solenoid DI. The switch DX is adapted to connect conductor 63 with a conductor 64 or a conductor 65. Conductor 65 includes the switch 55 and the coil of relay 54 and is connected with return line 31. Conductor 64 includes the coil of solenoid 62. A conductor 66 connects conductor 37 with branch circuits 67 and 68, each including a resistor R with a white light 67a in branch 67 and a red light 68a in branch 68. Conductor 67 connects with conductor 30a and conductor 68 leads to the fixed terminal of switch 56 which connects by a conductor 69 with one of the contacts of switch 58 that is connected by a conductor 70 with the switch CN. A conductor 71 connects conductors 70 and 30a together.

Portions of conductor 65 may be connected together by a conductor 72 including switch 59. A conductor 75 connects conductor 30a with conductor 31 and includes the coin depletion switch DRS and the coil of a relay 57.

In the above described circuits, when the operator depresses one of the key K of either keyboard to operate one or more of the rockers R, this rocker or rockers are swung down to contact and swing the bar 5 down to engage the foot 6 of lever 7 to move the actuator 13 of pilot switch IS to close this switch and thereafter the actuated rocker or rockers also act to close one or more of the switches controlling the coin ejector positioning solenoids.

On closure of switch IS, the hand switch LS being closed, current from conductor 30 passes through switch IS to conductor 63, switch DX, conductor 65, coil of relay 54 to return line 31 energizing relay 54 and through conductor 63a including coil of relay DI to conductor 37 to return line 31 energizing this relay. Current also passes from conductor 30a through conductor 67 including white light 67a to conductor 66, conductor 37 to return line 31 lighting the white light. Energization of relay 54 moves switches 41 and 52 to their other positions and energization of relay DI has no effect at that time.

Closure of switch 52 connects conductor 42 with conductor 53 and return line 31 so that when on the depression of the key or keys any one or more of the switches 1¢, 2¢, 2¢A, 5¢, 10¢, 10¢A, 25¢, or 50¢ are closed, the solenoids controlled by these switches will be energized to position their associated ejectors in coin ejecting position.

On closure of switch 41, current from conductor 30b passes to conductor 39 and then through branch 36a to the motor M, conductor 31c to return 31 and through branch 36b to the coil of solenoid CS through conductor 38 to return 31 to operate the clutch BI, BF, and BE to connect shaft AD with the motor and also passes through conductor 36 to the coil of solenoid BS and conductor 37 to return line 31 to energize solenoid BS.

On energization of solenoid BS the rack bar 23 is shifted to shift the depressed rocker or rockers R so that the depression of any other keys will have no effect. As the rack bar 23 shifts toward the right as viewed in FIG. 5, the switch operating lever 7 is released therefrom to cut out the switch IS, but now the screw 128 is acting on the actuator 132 for the switch MS to close this switch so that current from the line 30a now passes through conductor 35 to the conductor 63 to maintain the circuits previously established by the switch IS to relays 54 and DI to maintain the circuit to the motor M and the solenoid CS.

Now as the motor M turns the shaft AD, the levers AG through the links AA are swung clockwise as viewed in FIG. 7 so that the solenoid positioned fingers act on the coins in their associated coin channels to eject them therefrom into a discharge chute DC from which through suitable chute structure (not shown) they are carried out of the machine. As the motor continues to operate, the crank pin DB contacts the lever DC to swing it to its other position to shift actuator DG and its switch DX to its other position to connect conductor 63 with conductor 64, and since solenoid DI is then energized as the rear end of lever DC swings up, the latching lever DN engages with the latching projection DH to hold the lever DC in this position before switch DX opens conductor 65.

Shifting of switch DX to its other position disconnects conductor 65 to deenergize relay 54 so that switches 41 and 52 move back to their initial positions, thereby openink the circuits to the motor, the clutch, the solenoid BS, and any of the ejector positioning solenoids S1¢ to S50¢ previously referred to, and current now passes from conductor 30a through a conductor 76, switch DX, conductor 64 to the return 31 energizing coil 62 to release latch 61 and then as the crank DB moves to its initial position and actuator DG being a spring moves lever DC back to its initial position.

In the event that the coins in any one of the channels become depleted, the finger CB of the channel moves outwardly into the channel to release the pressure of the spring CG on lever CD which is the actuator for switch CN so that switch CN may move into contact with terminal 34 and then current from conductor 30a passes via conductors 71 and 70 to conductor 33 and return line 31 energizing solenoid 32 to shift switches 56 and 55 to their other positions.

On shifting of switch 56 to its other position, current from conductor 30a passes through conductor 71, switch 58, and conductor 69, switch 56, conductor 68 through red light 68a, conductors 66 and 37 to the return 31, lighting the red light and shifting switch 55 opens the conductor 65 so that relay 54 cannot be operated to establish current flow to the motor M. Under these conditions one or more dispensing operations may be obtained by one or more depressions of the depletion release key DR to close switch DRS.

On closing switch DRS current from conductor 30a passes through conductor 75 to energize relay 57 to shift switches 58 and 59 to their other positions in which the relay 57 is latched in by the latch 61.

Movement of switch 58 to its other position breaks the circuit previously described to the red light, and movement of switch 59 to its other position allows (on the depression of a key K and closing of switch IS) current to pass to conductor 63, switch DX, conductor 65, conductor 72 to the part of conductor 65 beyond the switch 55 to return to energize relay 54 so that the machine will operate as previously described to dispense coins, and then on the completion of the cycle, the solenoid 62 is energized to release the latch 61 so that relay 57 returns to its initial position, returning switches 58 and 59 to their initial positions.

Thereafter on the restoring of coins to the depleted stack or channel, the machine will again be ready for normal operation.

The payer switchboard, FIG. 1, also includes special keys that are double circled and numeralled 5, 10, 25, 50, and 100. These keys are adapted when depressed to furnish the amounts stated on the keys, in which case the key 5 will act to operate the channels A, B, and C to dispense 5 pennies, the 10 key will operate to dispense coins from the channels A, B, C, and D. The 25 key will act to dispense coins from the channels D, E, and F, the 50 key from the channels D, E, F, and G, and the 100 key from the channels D, E, F, G, and H in the same manner that a depression of any one of the keys 1 to 99 acts to dispense coins through the mechanisms heretofore described.

Referring to FIG. 15, which shows the changer, since a changer is designed to dispense the amount representing the difference between the amount received and the purchase price, the same keys as such that are used in the payer are numbered differently to accommodate such transactions, for example, the number 99 key of the payer becomes the number 1 key of the changer, and similar changes are made for the other keys. The double circle keys 5, 10, 25, 50, and 100 act in the same way to dispense change as those of the payer. In addition to the above keys and the depletion release key DR, there are 3 special keys numbered 25S, 50S, and 75S disposed below the main keys. The main switches of the changer, to wit: the 1¢, 2¢, 2¢A, 5¢, 10¢, 10¢A, 25¢, and 50¢ are adapted to be operated to close the circuits through the conductors 43 to 50, rsepectively, in the same way that the corresponding keys of the payer act to energize the solenoids S1¢, S2¢, S2¢A, S5¢, S10¢, S10¢A, S25¢, and S50¢, but since in a changer a tender of less than a dollar may be received for less than a dollar purchase, there are auxiliary switches controlled by the special keys 25S, 50S, and 75S that are included in the circuit in such a way as to cooperate with the main keys that are similar to the same keys of the payer to take care of the most usual tenders of less than a dollar. All that is necessary, however, to convert the device from a payer to a changer with the special keys is to change the upper part of the circuit shown in FIG. 12 including the denominational keys to that shown in FIG. 14 which will now be described.

The hot wire corresponding to the conductor 30a of the payer is identical therewith and supplies current to the switches 1¢ to 50¢, previously identified, and the conductors 43, 44, 45, 46, 47, and 48 are identical to those previously described and connect, respectively, with the solenoids S1¢, S2¢, S2¢A, S5¢, S10¢, and S10¢A while the switches 25¢ and 50¢ are wired to act in conjunction with the special switches 50SA and 75SA which are arranged in circuits that render the operation of either or both the switches 25¢ and 50¢ ineffective to dispense coins. For this purpose the conductor 49a that corresponds to conductor 49 includes the switch 75SA and the conductor 50a that corresponds to conductor 50 includes the switch 50SA. With the switches 75SA and 50SA in closed position, change is made by the changer on a dollar basis. If the tender given is seventy-five cents, the depression of the special key 75S opens switch 75SA and the circuit 49a to prevent the switch 25¢ being effective to operate the solenoid S25¢. If the tender given is fifty cents, the depression of the special key 50S opens the switch 50SA and the circuit 50a to prevent the switch 50¢ being effective to operate the solenoid S50¢, and if the tender given is twenty-five cents, the depression of the key 25S opens both switches 75SA and 50SA to open both circuits 49a and 50a to prevent the solenoids S25¢ and S50¢ from being operated. For tenders other than 75, 50, or 25 cents for purchases less than these amounts, the operator has to mentally figure the change and depress the proper change keys for the amount of change to be dispensed.

For example, if a quarter and a dime are given for a thirty cent purchase, the operator depresses the 95 key of the changer so as to give the purchaser his nickel change.

The special keys 75S, 25S, and 50S are of the well known spring returned latching type so that after a dispensing operation these keys have to be released. For this purpose a solenoid RR has a plunger 80 which is slotted to receive the downwardly angled end 81 of a release bar 82. Bar 82 is suitably guided through suitable pin and slot connections 83 connected with the frame of the machine and has key registering slots 84. Normally the release bar 82 and the plunger 80 of the solenoid are urged toward the left as viewed in FIG. 16 by a spring 85. Pressure on any one of the keys will act because of the locking projection 86 to cam the release bar 84 toward the right as viewed in FIG. 16 until the projection 86 passes the bar and is snapped down against it by the key spring. When so locked, energization of the solenoid RR will again move the release bar 82 to a position which will allow the projection 86 to move out from under the bar and be released through the opening 84 by the key spring.

The solenoid RR is energized by the connection of a conductor 87 with conductor 64 which receives current from conductors 30a, 71 and 76 when the switch DX is shifted to connect conductor 76 with conductor 64.

We desire it to be understood that this invention is not to be limited to any particular form or arrangement of parts except in so far as such limitations are included in the claims.

What we claim as our invention is:

1. In a coin changer comprising a plurality of coin channels including a quarter channel and a half dollar channel, the combination of a keyboard having a plurality of keys numbered from 1 to 99 operable to effect a return of change on a dollar basis, special keys 25, 50 and 75 for tenders of 25, 50 and 75 units respectively, and operable to effect a return of change on less than a dollar basis in conjunction with said first named keys, a plurality of switches controlled by said first named keys, a pair of other switches controlled by said special keys and including a common actuator means controlled by said special 25 key for concurrently controlling the operation of both of said other switches, coin ejector mechanism in a respective coin channel for each denomination of coin to be dispensed, electrically operated means for said ejector mechanisms controlled by the selective operation of said switches, a control circuit for said electrically operated means including said first named switches and said other switches, said switches controlled by said special keys arranged to incapacitate the action of the switches controlling the action of the ejector mechanisms for the quarter and half dollar channels and operable by said first named keys when the amount received is less than a dollar.

2. In a coin dispensing machine, the combination of a plurality of coin channels for different denominations of coins, a coin ejector mechanism for each coin channel, selectively operable electrically operated means for rendering a coin ejector mechanism operable by said common actuator and including a control switch and an operating rocker for said switch, a keyboard having a plurality of keys numbered from 1 to 99 for selectively operating the said rockers, locking means for maintaining a key selected rocker in its operating position and comprising a rocker locking member, an electrically operated actuator for moving said locking member to its locked position, a control circuit for said actuator including a relay and a rocker operated pilot switch for energizing said relay, means operable by said locking member in its movement to locked position to open said rocker operated pilot switch, and means for maintaining said relay energized during the period in which the respective coin ejector mechanisms are being electrically operated and for releasing said relay upon completion of the coin ejection from the respective channels by said ejector mechanisms.

3. In a coin dispensing machine, the combination of a plurality of coin channels for different denominations of coins, a coin ejector mechanism for each coin channel, a common electrically controlled actuator for all of said ejector mechanisms, selectively operable electrically operated means for rendering a coin ejector mechanism operable by said common actuator and including a control switch and an operating rocker for said switch, a keyboard having a plurality of keys numbered from 1 to 99 for selectively operating the said rockers, locking means for maintaining a key selected rocker in its operating position and comprising a rocker locking member, an electrically operated actuator for moving said locking member to its locked position, a control circuit for said last mentioned actuator including a relay and a rocker operated pilot switch for energizing said relay, a control circuit for said common ejector mechanism actuator including a normally open switch, means operable by said locking member in its movement to locked position to open said rocker operated pilot switch and to close said last named switch to thereby maintain the circuit to said ejector mechanism actuator, and means for maintaining said relay energized during the period in which the respective coin ejector mechanisms are being actuated by said first mentioned actuator and for releasing said relay upon completion of the coin ejection from the respective channels by said ejector mechanisms.

4. In a coin dispensing machine having a plurality of coin channels for different denominations of coins, the combination therewith of a plurality of key controlled normally open switches, a keyboard having a plurality of keys numbered from 1 to 99 for selectively controlling said switches, a coin ejector mechanism including a movable ejector for each denomination of coin to be dispensed, a plurality of solenoids each controlled by a respective one of said switches and arranged for moving a respective ejector into operating dispensing relationship with a coin to be dispensed, electrically operated means for operating the coin ejectors that have been rendered operative and including a control switch and an electrically operated key controlled locking member for maintaining a key selected switch in its closed position and for holding said ejector operating control switch in its closed position, and means for maintaining said locking member in locking position during the period in which the respective coin ejector mechanisms are being actuated by the said electrically operated means and for releasing said control switch upon completion of the coin ejection from the respective channels by said ejector mechanisms.

5. In a coin dispensing machine, the combination of a plurality of coin channels, a coin ejector mechanism for each channel, electrically operated means for said ejector mechanisms, a control switch for each ejector mechanism, a keyboard having a plurality of keys numbered from 1 to 99, rockers selectively controlled by said keys for operating said switches, a reciprocatory locking member for locking any one or more of said key operated switches in an operative position, a control circuit including a solenoid for moving said locking member to its locked position, a relay controlling said solenoid and a key controlled switch for energizing said relay, said last named switch having a movable base, and means for moving said base to release said switch from its key control as said locking member moves to locked position, and means for maintaining said relay energized during the period in which the respective coin ejector mechanism are being actuated by the said electrically operated means and for releasing said relay upon completion of the coin ejection from the respective channels by said ejector mechanisms.

6. In a coin dispensing machine, the combination of a plurality of coin channels, a coin ejector mechanism for each channel, electrically controlled means for selectively operating said coin ejector mechanisms including operator controlled keys, coin controlled means for preventing operation of said electrically controlled means in the event of a coin depletion in any of said channels, means for restoring said electrically controlled means to operative condition for another operation including a relay and an operator controlled depletion release switch, said relay being a latching relay to permit operation of said electrically controlled means by said keys as in normal operation, and means for unlatching said latching relay upon completion of the coin ejection from the respective channels during the restoration of said ejector mechanisms to operative condition and after manual operation of said depletion release switch.

7. In a coin dispensing machine, the combination of a plurality of coin channels, a coin ejector mechanism for each channel, electrically controlled means for selectively operating said coin ejector mechanisms including operator controlled keys, coin controlled means for preventing the operation of said electrically controlled means in the event of a coin depletion in any one said channels, means for restoring said electrically controlled means to operative condition for another operation including a relay and an operator controlled depletion release switch, said relay being a latching relay to permit operation of said electrically controlled means by said keys in a normal operation, a signal circuit controlled by said relays including a red light operable to indicate a coin depletion, and means for unlatching said latching relay upon completion of the coin ejection from the respective channels during the restoration of said ejector mechanisms to operative condition and after manual operation of said depletion release switch.

8. In a coin dispensing machine, the combination of a plurality of coin channels for different denominations of coins, a coin ejector mechanism for each channel, a control switch for each ejector mechanism, selectively operable electrically operated means for rendering a coin ejector mechanism operable to dispense a coin including a control switch, an operating rocker for each switch, and a keyboard having a plurality of keys numbered from 1 to 99 for selectively operating said rockers, means for locking the key selected rocker in its operating position comprising a locking member, an electrically operated actuator for moving said member to its locked position, a control circuit for said actuator including a relay and a rocker operated switch for energizing said relay, a second switch for controlling said relay, means operable by said locking member to open said rocker operated switch and close said second switch to maintain said relay energized during the period in which the respective coin ejector mechanisms are being actuated by said first mentioned actuator and for releasing said relay upon completion of the coin ejection from the respective channels by said ejector mechanisms.

9. In a coin dispensing machine, the combination of a plurality of coin channels for different denominations of coins, a coin ejector mechanism for each channel, a control switch for each ejector mechanism, selectively operable electrically operated means for rendering a coin ejector mechanism operable to dispense a coin including a control switch, an operating rocker for each switch, and a keyboard having a plurality of keys numbered from 1 to 99 for selectively operating said rockers, means for locking the key selected rocker in its operating position comprising a locking member, an electrically operated actuator for moving said member to its locked position, a control circuit for said actuator including a relay and a first switch for energizing said relay, a second switch for controlling said relay, a pivoted member on which said first and second switches are mounted, said first switch having a pivoted actuator, a member common to all of the rockers for actuating said pivoted actuator, an actuator for said second switch mounted to move with said locking member and an operating connection between said locking member and said pivoted member whereby the movement of said locking member swings said pivoted member to release the actuator for the first switch from said member common to all the rockers and closes said second switch to maintain said relay energized during the period in which the respective coin ejector mechanisms are being actuated by said first mentioned actuator and for releasing said relay upon completion of the coin ejection from the respective channels by said ejector mechanisms.

References Cited in the file of this patent

UNITED STATES PATENTS

| | | |
|---|---|---|
| 1,007,167 | Wickline | Oct. 31, 1911 |
| 2,406,948 | Hoffman et al. | Sept. 3, 1946 |
| 2,547,563 | Buchholz | Apr. 3, 1951 |
| 2,675,006 | Buchholz | Apr. 13, 1954 |